R. DOMMAN.
WHEEL.
APPLICATION FILED JULY 1, 1908.
907,475.
Patented Dec. 22, 1908.
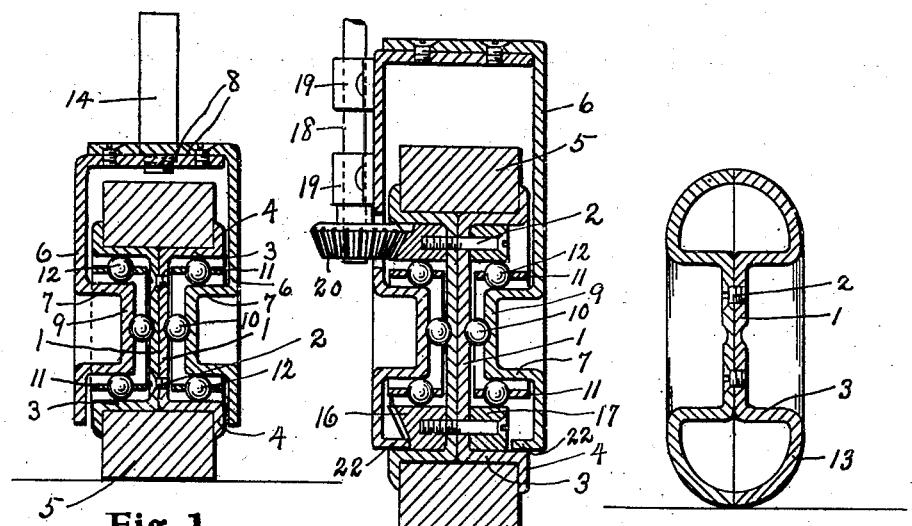
Fig. 1.  Fig. 2.  Fig. 3.
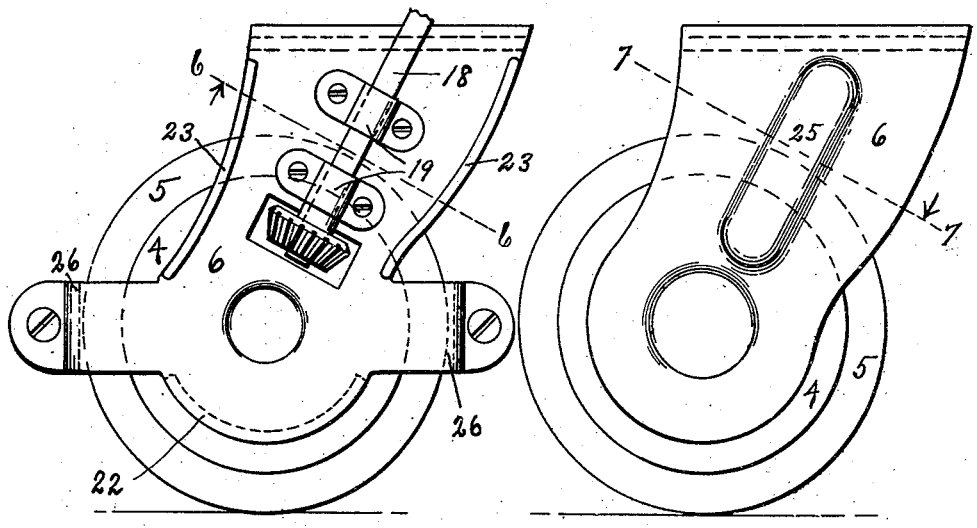
Fig. 4.  Fig. 5.
Fig. 6.  Fig. 7.
Witnesses
C. B. Baenziger.
G. Wilson.
Inventor
R. Domman
By Edward N. Pagelsen, Attorneys

UNITED STATES PATENT OFFICE.

ROBERT DOMMAN, OF PONTIAC, MICHIGAN.

WHEEL.

No. 907,475.

Specification of Letters Patent.

Patented Dec. 22, 1908.

Application filed July 1, 1908. Serial No. 441,315.

*To all whom it may concern:*

Be it known that I, ROBERT DOMMAN, a citizen of the United States, and a resident of Pontiac, in the county of Oakland and State of Michigan, have invented a new and useful Wheel, of which the following is a specification.

This invention relates to wheels for roller skates, casters for furniture, trolleys and any other purposes where easy and silent running is desirable, and its object is to provide wheels for such purposes that shall be light and comparatively inexpensive.

My invention consists of a wheel comprising a flat disk, laterally extending cylindrical flanges and a tire, together with a frame having inwardly projecting hubs, and of anti-friction balls properly placed around the hubs within the flanges to secure easy running.

In the accompanying drawing, Figure 1 is a vertical transverse cross section of the wheel and frame. Fig. 2 is a similar cross section of the wheel and frame in a slightly modified form. Fig. 3 is a transverse cross section of another form of wheel. Fig. 4 is a side elevation of the wheel and frame shown in Fig. 2. Fig. 5 is another view of a modified form of frame. Fig. 6 is a cross section on the line 6—6 of Fig. 4 of one side of the frame. Fig. 7 is a similar cross section on the line 7—7 of Fig. 5.

Similar reference characters refer to like parts throughout the several views.

The different parts of the wheel shown in Fig. 1 are two similar web disks 1, secured together by means of the screws 2 or in any other desired manner. Cylindrical flanges 3 project from these webs and radial flanges 4 from the cylindrical flanges. Between the radial flanges is held a tire 5 of any desirable material, such as compressed paper, rubber, or wood fiber. The webs and flanges may be formed from sheets of metal by stamping or drop-forging, or may be castings.

The frames are formed with sides 6 and overlapping top-pieces 8 that may be secured together or made integral. These frames may also be drop-forged or stamped to form cylindrical hubs 7 having end disks 9. Sets of bearing-balls 12 may be held in position by means of any of the well known types of ball-retainers, perforated rings 11 being shown in the drawings. To prevent lateral movement of the wheels within the frame, the wheel webs 1 and hub-ends 9 are formed with slight depressions in which are placed the balls 10.

In Fig. 3 is shown a wheel which is adapted for light furniture casters, in which the flange 4 of Fig. 1 is extended to form a tread 13. When these wheels are used for casters, the swivel pin 14, Fig. 1 may be attached to the top 8 of the frame.

It may sometimes be desirable to use wheels of this type for driving, in which case a toothed ring 16 may be secured to the web 1, which ring will also serve as the bearing ring for the ball-race on that side. A similar bearing ring 17 may be secured to the web on the other side to bring the parts to similar proportions.

A driving shaft 18 is mounted in bearings 19 on the frame and carries a driving gear 20 that meshes with the toothed ring 16.

To prevent grit from entering, the side pieces may be bent in at their lower edges as shown at 22. (Figs. 2 and 4.)

To stiffen the frame, flanges 23 may be formed at the outer edges of the side pieces, or the middle may be bulged out to form the bead 25 shown in Figs. 5 and 7. To further stiffen the frame, the lips 26 may be formed on each side piece, which lips bend around the wheel and then outward, and are joined by means of screws or rivets, thus holding the side pieces properly spaced. This construction may be employed for the two front wheels of invalids' chairs when the patient is able to use his arms to propel the same. The proper connections can be supplied by any mechanic.

Many details of construction may be changed to suit requirements without departing from the spirit of my invention.

What I claim as my invention and desire to secure by Letters Patent is:—

1. A new article of manufacture comprising a wheel formed of flat disks, a cylindrical bearing flange projecting outwardly from each disk, a frame comprising side pieces extending on each side of the wheel and having inwardly projecting hubs having closed ends formed thereon, and balls seated in depressions formed in the center of each hub and disk.

2. A new article of manufacture, comprising a wheel formed of flat disks, a tire, and flanges integral with the disks and embracing the tire, a frame having inwardly projecting hubs formed thereon, and bearing balls between the flanges and hubs.

3. The combination with a wheel comprising two central flat contacting disk-webs, cylindrical flanges extending laterally therefrom, and a tire, of a frame comprising side-pieces extending on each side of the wheel and formed with inwardly projecting hubs having closed ends, of a ball centrally mounted between the closed end of each hub and the wheel, and of sets of bearing-balls mounted between each hub and the adjacent cylindrical flange of the wheel.

4. The combination of a wheel comprising a tire, annular flanges within the same, contacting circular disks one integral with each of said flanges, and a toothed ring secured to the outside of one disk, together with a frame inclosing said wheel and comprising connected side-pieces and inwardly projecting hubs formed on the same, bearing-balls arranged in sets around the hubs and in engagement with the flanges, a revoluble shaft mounted on the frame, and a toothed driving wheel mounted on said shaft and adapted to engage the toothed ring to drive the wheel.

In testimony whereof, I have signed this specification in the presence of two subscribing witnesses.

ROBT. DOMMAN.

Witnesses:
   A. L. MOORE,
   R. A. GREEN.